(12) United States Patent
Eom et al.

(10) Patent No.: US 9,759,408 B2
(45) Date of Patent: Sep. 12, 2017

(54) ILLUMINATING MEMBER FOR REDUCING UNIFIED GLARE RATING AND LIGHTING DEVICE USING THE SAME

(75) Inventors: Jun Phill Eom, Seoul (KR); Dong Mug Seong, Seoul (KR); Dong Hyun Lee, Seoul (KR); Beom Sun Hong, Seoul (KR); Yong In Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/239,496

(22) PCT Filed: Jul. 26, 2012

(86) PCT No.: PCT/KR2012/005959
§ 371 (c)(1),
(2), (4) Date: Feb. 18, 2014

(87) PCT Pub. No.: WO2013/024978
PCT Pub. Date: Feb. 21, 2013

(65) Prior Publication Data
US 2014/0192540 A1    Jul. 10, 2014

(30) Foreign Application Priority Data

Aug. 17, 2011 (KR) .................. 10-2011-0081492

(51) Int. Cl.
*F21V 17/10* (2006.01)
*F21S 8/02* (2006.01)
(Continued)

(52) U.S. Cl.
CPC .............. *F21V 17/101* (2013.01); *F21S 8/02* (2013.01); *F21V 5/008* (2013.01); *F21V 5/004* (2013.01);
(Continued)

(58) Field of Classification Search
CPC .... G02F 1/133308; F21V 5/004; F21V 5/008; F21V 17/101; C09J 2201/128
(Continued)

(56) References Cited

U.S. PATENT DOCUMENTS 6,871,982 B2    3/2005 Holman et al.
2004/0008524 A1    1/2004 Lee et al.
(Continued)

FOREIGN PATENT DOCUMENTS

JP    2009294240 A    12/2009
JP    2010-039091 A    2/2010
(Continued)

OTHER PUBLICATIONS

International Search Report in International Application No. PCT/KR2012/005959, filed Jul. 26, 2012.
(Continued)

*Primary Examiner* — Peggy Neils
*Assistant Examiner* — William N Harris
(74) *Attorney, Agent, or Firm* — Saliwanchik, Lloyd & Eisenschenk

(57) ABSTRACT

Disclosed is a lighting device capable of reducing UGR (Unified Glare Rating). in a illuminating member, reflection efficiency of light significantly scattering to the left and right among light applied to the air gap through the diffusion plate is increased using the adhesion material pattern layer of periphery surrounding an air gap, and simultaneously, the UGR may be reduced by removing the process disposing the pattern with a specific structure and increasing the process efficiency.

15 Claims, 7 Drawing Sheets

(51) Int. Cl.
  *F21V 5/00* (2015.01)
  *F21V 5/04* (2006.01)
  *F21V 15/01* (2006.01)
  *G02B 3/00* (2006.01)
  *F21Y 105/10* (2016.01)
  *F21Y 115/10* (2016.01)

(52) U.S. Cl.
  CPC ................. *F21V 5/04* (2013.01); *F21V 15/01* (2013.01); *F21Y 2105/10* (2016.08); *F21Y 2115/10* (2016.08); *G02B 3/0056* (2013.01)

(58) Field of Classification Search
  USPC .......... 362/97.4, 311.01, 355, 367, 632, 633, 362/634
  See application file for complete search history.

(56) References Cited

U.S. PATENT DOCUMENTS

| | | |
|---|---|---|
| 2004/0200671 A1 | 10/2004 | Kugiya et al. |
| 2005/0202238 A1* | 9/2005 | Kishioka ................... B32B 7/12 |
| | | 428/355 AC |
| 2007/0002590 A1* | 1/2007 | Jang et al. ..................... 362/633 |
| 2007/0019410 A1* | 1/2007 | Kim et al. ..................... 362/235 |
| 2007/0297062 A1 | 12/2007 | Park et al. |
| 2008/0055929 A1 | 3/2008 | Kuroda et al. |
| 2008/0084693 A1* | 4/2008 | Shimada ................. F21S 8/026 |
| | | 362/240 |
| 2011/0096569 A1* | 4/2011 | Hamada ........................ 362/613 |
| 2011/0292302 A1* | 12/2011 | Park et al. ..................... 348/739 |
| 2012/0020079 A1* | 1/2012 | Chang ........................... 362/235 |
| 2014/0168993 A1* | 6/2014 | Lee et al. ................. 362/311.01 |

FOREIGN PATENT DOCUMENTS

| | | |
|---|---|---|
| KR | 10-2004-0003713 A | 1/2004 |
| KR | 10-2007-0010478 A | 1/2007 |
| KR | 100681078 B1 | 2/2007 |
| KR | 1020100039123 A | 4/2010 |

OTHER PUBLICATIONS

Extended European Search Report dated Feb. 24, 2015 in European Application No. 12824470.4.
Office Action dated May 4, 2016 in Chinese Application No. 201280040123.7.

* cited by examiner $$Sag = \frac{HEIGHT}{DIAMETER}$$

| fill factor | UGR(endwise) | UGR(crosswise) |
|---|---|---|
| 82% | 16.3 | 16.2 |
| 78% | 16.5 | 16.4 |
| 75% | 16.6 | 16.5 |
| 72% | 16.7 | 16.6 |
| 69% | 16.8 | 16.7 |
| 66% | 16.9 | 16.8 |
| 63% | 16.9 | 16.9 |
| 60% | 17 | 17 |
| 58% | 17 | 17.1 |
| 56% | 17.1 | 17.1 |
| 54% | 17.2 | 17.2 |
| 52% | 17.3 | 17.3 |
| 50% | 17.3 | 17.3 |

ILLUMINATING MEMBER FOR REDUCING UNIFIED GLARE RATING AND LIGHTING DEVICE USING THE SAME

CROSS-REFERENCE TO RELATED APPLICATIONS

This application is the U.S. national stage application of International Patent Application No. PCT/KR2012/005959, filed Jul. 26, 2012, which claims priority to Korean Application No. 10-2011-0081492, filed Aug. 17, 2011, the disclosures of each of which are incorporated herein by reference in their entirety.

TECHNICAL FIELD

The present disclosure relates to a lighting device capable of reducing an UGR (Unified Glare Rating).

BACKGROUND ART

Lighting using various light source is activities or functions to brighten a specific place with some purpose and is widely used to brighten the environment at night or in dark places.

FIG. 1 is a cross section view of a flat plate illuminating device according to an example of a prior art. In FIG. 1, the illuminating device of the prior art includes a light source 10, louver or reflector 20. The light source 10 uses an incandescent lamp, LED, CCFL, etc. In FIG. 1, angles of the light shown in dotted lines are passed to the person, thereby causing visual discomfort. Such a illuminating device may reduce the UGR, but doses not become aesthetic or perfect flat plate lighting.

FIG. 2 is a cross section view of the flat plate illuminating device according to an example of the prior art.

In FIG. 2, a illuminating device 30 includes a diffusion plate 40 diffusing the optical source 10 and the light emitted from the optical source 10. The light emitted from the optical source 10 is emitted into the outside through the diffusion plate 40. The diffusion plate 40 reduces a hot spot of the optical source 10 and is used to evenly emit the light. Although the diffusion plate 40 is used, as shown in FIG. 2, the light of angles shown in dotted lines still gives discomfort to the human eye. That is, the diffusion plate 40 scatters the light up to the direction occurring highly the UGR, thereby causing a glare, such that the user's eye become tired, which does not meet criteria of indoor flat plate illuminating device.

Thus, it is important to reduce the glare in the indoor flat plate illuminating. The degree of displeasure due to the glare is represented by a constant called the UGR (Unified Glare Rating). That is, the UGR is value quantifying the degree giving the displeasure to the humans using the lighting.

When assuming the direction facing from the ceiling disposed with the illuminating device to the bottom side as 0 deg and the direction parallel to the ceiling as 90 deg, the UGR is calculated as the value of speed of light becoming 65 deg~90 deg That is, when reducing speed of light of 65 deg~90 deg, the glare is reduced. In Europe and Unites States, the illuminating device having the UGR of 19 or less is used as the indoor illuminating device.

As such, the current most indoor flat plate illuminating device may use the reflector or the louver, and reduces the angles of the light to be spread to a wide range that affects the UGR by embedding the whole illuminating device. In the prior art, although the diffusion plate is used, it is possible to reduce the effect of the hot spot but which is still not acceptable for the UGR standard of 19 or less.

DISCLOSURE OF INVENTION

Technical Problem

An aspect of the present disclosure is directed to a illuminating member forming an air gap between a number of plates to be laminated, increasing reflection efficiency using a adhesion material pattern layer of a periphery surrounding the air gap, and simultaneously, reducing the UGR by removing the process disposing the pattern with a specific structure and increasing the process efficiency, and a lighting device using the same.

Solution to Problem

According to an embodiment of the present disclosure, an illuminating member of the disclosure includes an adhesion layer formed in one side of a diffusion plate or an optical plate and forming an air gap, and an optical plate bonded with the diffusion plate via the adhesion layer and condensing light passing through the air gap.

According to another embodiment of the present disclosure, a lighting device of the disclosure includes a printed circuit board with a light source; a frame portion formed around region at which the light source is disposed; and an insertion portion simultaneously inserting the diffusion plate and the optical plate into the inside of the frame portion, further includes an illuminating member in which an adhesion layer forming the air gap in the bottom side of the diffusion plate or the optical plate is bonded with the optical plate.

Advantageous Effects of Invention

According to an embodiment of the present invention, in a illuminating member, the reflection efficiency of the light significantly scattering to the left and right among the light applied to the air gap through the diffusion plate is increased using the adhesion layer of the periphery surrounding the air gap, and simultaneously, the UGR may be reduced by removing the process disposing the pattern with a specific structure and increasing the process efficiency.

According to another embodiment of the present invention, the lighting device of the disclosure includes an optical plate formed with the micro lens pattern and performing condensing function, thereby further reducing the UGR by downwardly gathering light passing through an air gap.

BRIEF DESCRIPTION OF DRAWINGS

FIG. 13 shows the result adjusting a fill factor of micro lens patterns to reduce the UGR in a structure of the optical plate according to the disclosure shown in FIG. 10.

MODE FOR INVENTION

Figure 1:
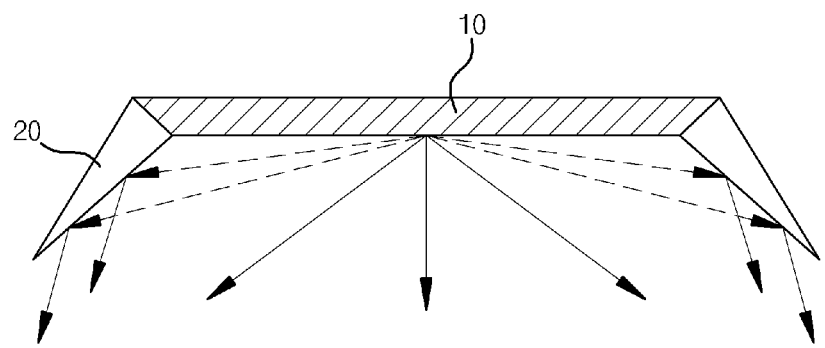
FIG. 1 is a cross section view of a flat plate illuminating device according to an example of a prior art.
Figure 2:
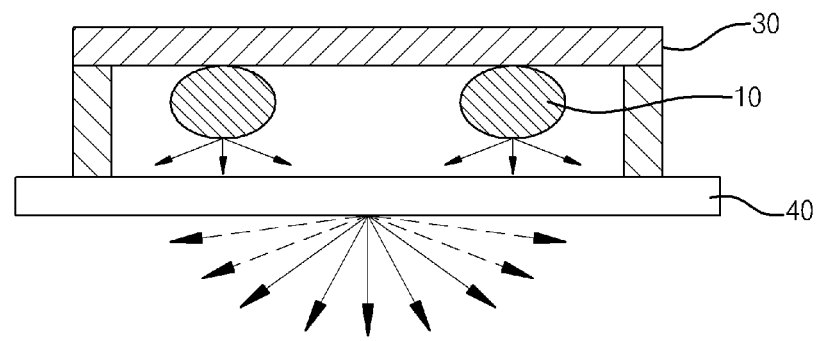
FIG. 2 is a cross section view of the flat plate illuminating device according to an example of the prior art.

Exemplary embodiments of the present disclosure will be described below in detail with reference to the accompanying drawings. Wherever possible, the same reference numerals will be used to refer to the same elements throughout the specification, and a duplicated description thereof will be omitted. It will be understood that although the terms 'first', 'second' etc. are used herein to describe various elements, these elements should not be limited by these terms. These terms are only used to distinguish one element from another element.

Figure 3:
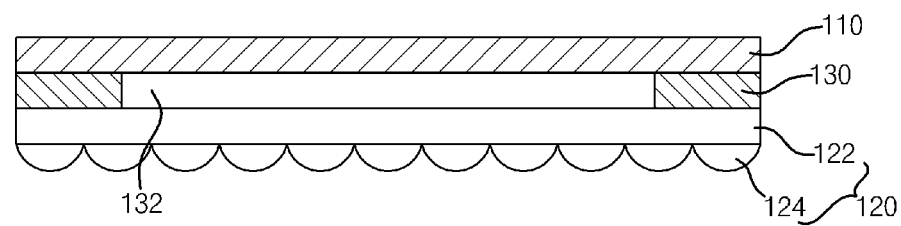
FIG. 3 is a cross section view of an illuminating member according to one embodiment of the present invention.

FIG. 3 is a cross section view of an illuminating member according to one embodiment of the present invention.

In FIG. 3, the disclosure is to provide an illuminating member including an adhesion material pattern layer 130 formed in bottom side of a diffusion plate 110 and forming an air gap 132, and an optical plate 120 bonded with the diffusion plate via the adhesion material pattern layer 130 and condensing the light passing through the air gap. The term 'an adhesion material pattern layer' and a term 'an adhesion layer' have the same meaning and may be used together with in the disclosure.

Particularly, the diffusion plate 110 and the optical plate 120 are formed by the structure patterning adhesive material having adhesive properties to one side of the diffusion plate or the optical plate rather than being spaced apart from each other with a special partition wall member. Here, one side of the diffusion plate or the optical plate means a joint surface on which the diffusion plate faces the optical plate face, and the optical pattern is disposed at the other side facing one side of the optical plate. In this case, the optical pattern may be micro lens array pattern 124.

In the adhesion material pattern layer 130 of the disclosure, the special partition wall is disposed to dispose artificial air gap between each of plates, or the problems patterning the diffusion plate itself and adding molding process or adhering process of the partition wall are improved, and problem of reliability for adhesion between a special structure and a diffusion plate may be removed.

FIGS. 4 to 7 show examples forming the adhesion material pattern layer according to the disclosure. A pattern composing the adhesion material pattern layer of the disclosure may be formed in one side of the diffusion plate and one side of the optical plate jointed with the diffusion plate. In present embodiment, for example, it is described that the adhesion material pattern layer is formed on one side of the diffusion side.

Figure 4:
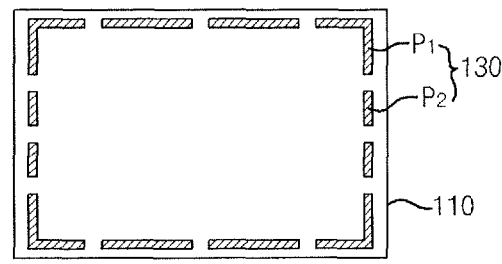
FIGS. 4 to 7 show various implementation examples of an adhesion material pattern layer according to the disclosure.

As shown in FIG. 4, the adhesion material pattern layer 130 of the disclosure may dispose a number of patterns P1, P2 separated by the adhesive by screen-printing a liquid adhesive on one side of the diffusion plate 110. Therefore, processes manufacturing the special pattern are removed to simplify the processes.

The pattern composing the adhesion material pattern layer in FIG. 4 described above may be patterned to have constant thickness along with an edge of the diffusion plate, and the portion disposed as an adhesion pattern described above is inserted into an insertion portion of FIG. 9 described later. Of course, in contrast, the adhesion pattern disposing the special adhesion material pattern layer is formed using double-sided adhesive tape to simplify the process.

Figure 5:
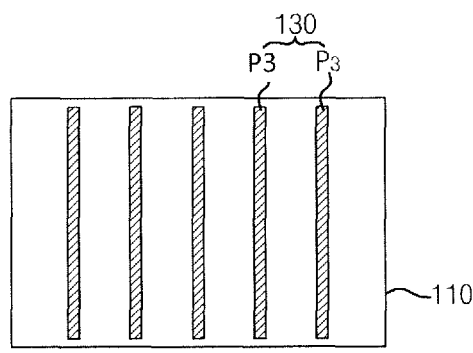

In FIG. 5, a structure of FIG. 5 is different structure from disposition way for the adhesion material pattern layer of FIG. 4, and a number of rib patterns P3 disposed on bottom side of the diffusion plate 110 in the first direction or in the second direction orthogonal to the first direction may be disposed by the way screen-printing liquid adhesion material or adhering the double-sided adhesive tape.

Figure 6:
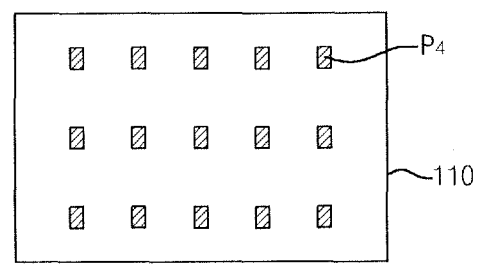

Alternatively, on the other hand, as structure shown in FIG. 6, the pattern composing the adhesion material layer may be disposed as the configuration to allow at least one separate pattern P4 to be arranged evenly or unevenly by the way screen-printing the adhesion material or adhering the double-sided adhesive tape to the bottom side of the diffusion plate or the optical plate.

Figure 7:
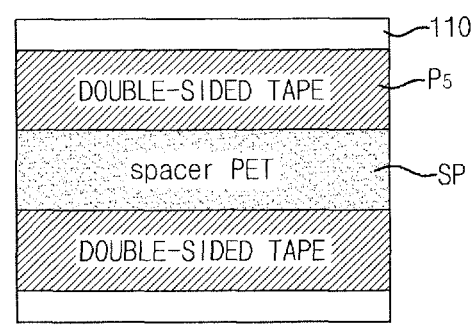

Alternatively, as structure shown in FIG. 7, it is possible to implement the pattern as structure that the adhesion material pattern P5 such as the double-sided adhesive tape is disposed on one side of the diffusion plate 110, and a spacer optical member SP is disposed in the middle of the double-sided adhesive tape. The optical member SP may use a transparent substrate such as PET.

As mentioned above, a prior way building the partition wall in the diffusion plate and forming the air gap between the diffusion plate and a optical sheet structurally cause problem of reliability for adhesion in molding process of the partition wall or process adhering the partition wall, or after adhering but when disposing and adhering the adhesion material pattern layer of the disclosure, the air gap may dispose simultaneously with the adhesion to simplify the process and improve a performance.

Figure 8:
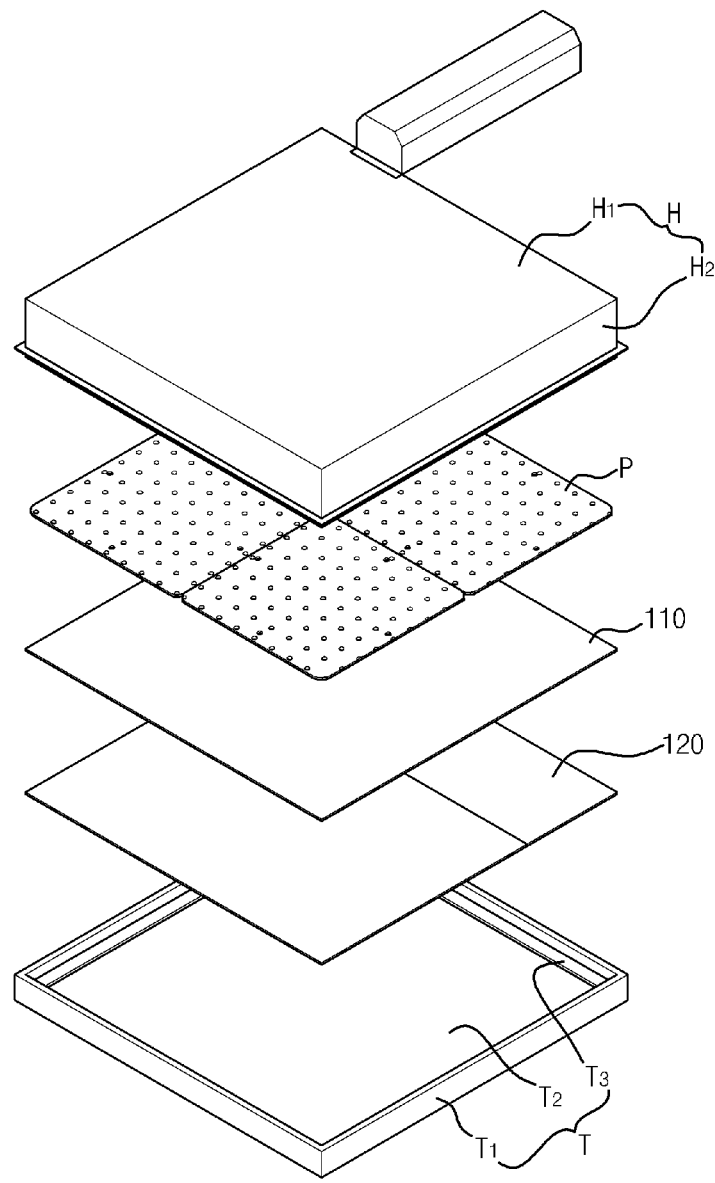
FIGS. 8 and 9 show a disassembled perspective view and a combined perspective view of a lighting device, respectively, according to the disclosure.
Figure 9:
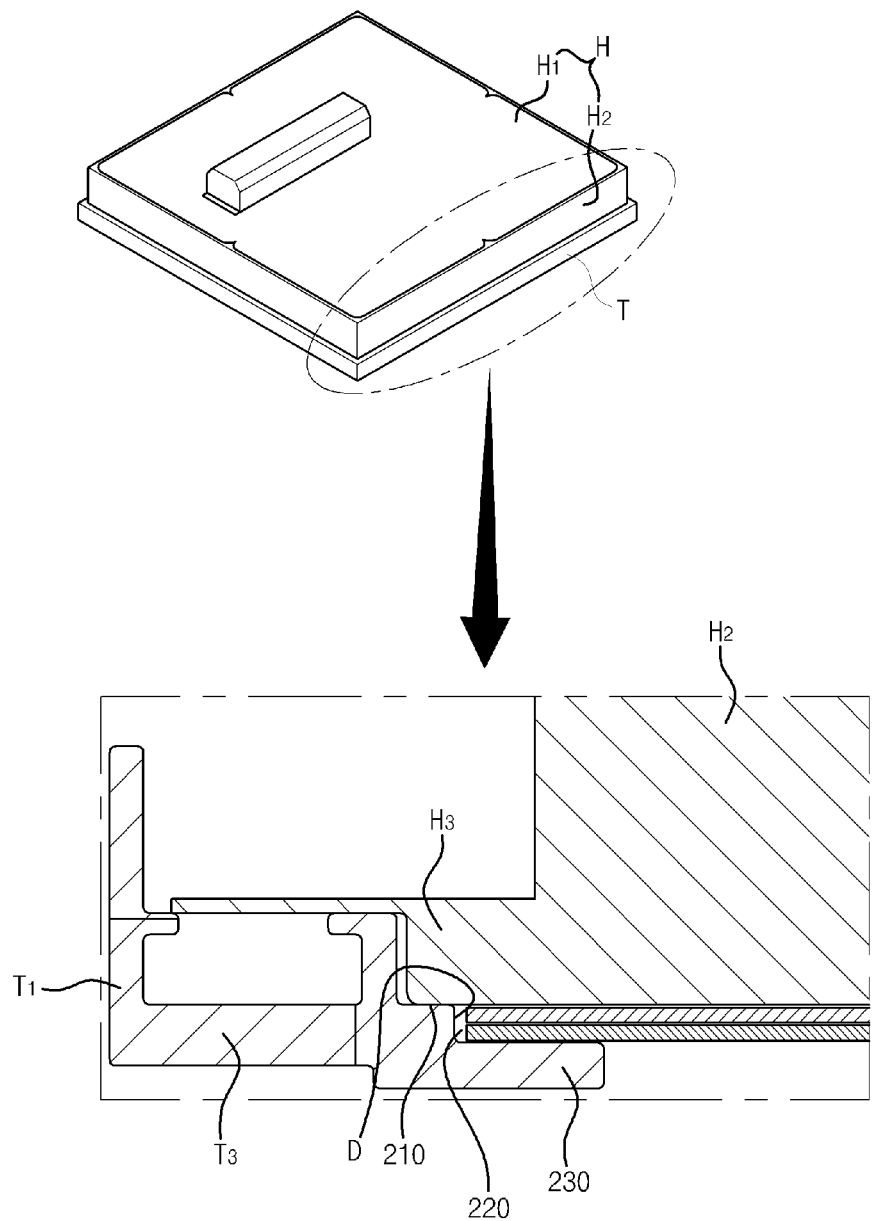

FIGS. 8 and 9 show an embodiment of the lighting device including the illuminating member according to the disclosure.

FIGS. 8 and 9 show a disassembled perspective view and a combined perspective view of the lighting device, respectively, according to the disclosure.

Referring to FIG. 8, the lighting device of the disclosure includes a printed circuit board with a built-in light source, a frame portion T formed around region at which the light source is disposed, and an insertion portion simultaneously inserting the diffusion plate 110 and the optical plate 120 into the inside of the frame portion. That is, in the lighting device, the diffusion plate 110 and the optical plate 120 are simultaneously laminated into the insertion portion of a single groove structure formed inside of the frame portion T.

Particularly, one side of the diffusion plate 110 or the optical plate 120 is provided with combined structure of the adhesion material pattern layer 130 formed in bottom side of the diffusion plate and forming the air gap, and optical plate 120 bonded with the diffusion plate via the adhesion material pattern layer 130 and condensing light passing through the air gap.

For example, the structure of FIG. 8 shows the structure to enable the frame portion H, T to separate as an example but on the other hand, the frame portion H, T are configured integrally and it is possible to form and mount a groove simultaneously inserting the diffusion plate 110 or the optical plate 120 shown in FIG. 3 inside of the frame portion. When the diffusion plate and the optical plate are simultaneously inserted as laminated structure, the adhesion material pattern layer P1 of FIGS. 3 to 7 is patterned on the joint surface of the diffusion plate and the optical plate, and an air layer (hereinafter, it is called an air gap) is formed between the diffusion plate and the optical plate via the adhesion material pattern layer, such that an optical characteristic may be improved through an air gap.

Hereinafter, the embodiment composing the frame portion disposed with separate structure besides frames of such an integrated structure will be described.

That is, in the structure shown in FIGS. 8 and 9, the frame portion H, T is separately formed by a first frame H and a second frame T, and the space portion is disposed as above-described insertion portion in the structure combining the first frame H and the second frame T. The diffusion plate 110 and the optical plate 120 are simultaneously inserted into the insertion portion, and the adhesion material pattern layer 130 is disposed on the bottom side of the diffusion plate 110 to form the bonding and the air gap without the special structure.

Specifically, the lighting device of the disclosure includes the first frame H including a base H1 disposing the printed circuit board with the built-in light source and a edge partition wall H2 formed outside the base portion, and the second frame T including the outside frame T1, corresponding to the edge partition wall H2, in which a center portion T2 thereof is opened and a guide frame T3 bended in the center portion from the outside frame to dispose as the separate structure. Particularly, in this case, the space portion 220 shown in FIG. 5 is formed in the structure combining the first frame and the second frame, and the diffusion plate 110 and the optical plate 120 are simultaneously inserted into the space portion. That is, the guide frame T3 among the configuration of the second frame T includes the diffusion plate 110 into which one end thereof is inserted, and the optical plate 120 for condensing formed with the micro lens pattern, and the adhesion material pattern layer 130 is disposed so that the air gap is formed in the joint surface between the diffusion plate and the adhesion material pattern layer 130.

Particularly, the first frame H is formed so that a front corresponding to the base H1 formed with the edge partition wall H2 is opened, and the printed circuit board P with the built-in light source is disposed on the inside surface of the base portion H1 formed with edge partition wall H2. Further, it is more preferable that a reflection layer (not shown) is further formed on surface of the printed circuit board and the inside side of the illuminating body to improve the efficiency of light reflection.

The second frame T formed to cover the edge partition wall H2 of the first frame H from the top is coupled as the structure composed and interleaved as a shape corresponding to the edge partition wall of the first frame H. The diffusion plate 110 and the optical plate 120 are coupled as the structure inserted to the insertion portion formed with the top of the edge partition wall and the second frame T, and the side of the optical plate 120 is exposed to the center of the top frame T.

In FIG. 9, the edge partition wall H2 of the first frame H of the disclosure is a partition wall structure built in the vertical direction from the base, and a partition wall supporting portion H3 is protruded in the horizontal direction from the partition wall at the top of the edge partition wall H2. The portion of the partition wall supporting portion H3 for the top of the edge partition wall H2 is coupled as the structure being in contact with the second frame T.

Particularly, in the disclosure, the second frame T includes the outside frame T1 formed in the vertical direction from the ground and the guide frame T3 connected and bent to the outside frame.

Particularly, the guide frame T3 includes a first guide portion 210 jointed with the top of the edge partition wall and one end of the guide frame, and a second guide portion 230 formed with a step D from the first guide portion 210 and disposing the space portion 220 to be spaced apart from the top side of the edge partition wall. The space portion 220 is above-described insertion portion so that the diffusion plate 110 and the optical plate 120 is simultaneously inserted and laminated into the single groove. That is, one ends of the diffusion plate 110 and the optical plate 120 are interleaved in a type inserted into the space portion 220 formed with the top side of the edge partition wall H2 and the guide frame T3. Particularly, a strong bonding and the air gap are disposed on the adhesion side of the diffusion plate and the optical plate by the adhesion material pattern layer described in FIG. 3 to FIG. 7.

The light emitting from the light source passes through the diffusion plate 110, and the light passing the diffusion plate is refracted by the air gap to enter the bottom of the optical plate 120. Then, light significantly scattering to the left and right among light applied to the air gap through the diffusion plate is refracted to input to the optical plate, such that the air gap may reduce the UGR.

Particularly, the micro lens pattern array is formed in one side of the optical plate 120 to condense the light passing through the air gap into the portion that user want to shine the light, to spread the light, and simultaneously to refract light passing through the air gap once again, thereby adjusting the levels of the UGR.

Figure 10:
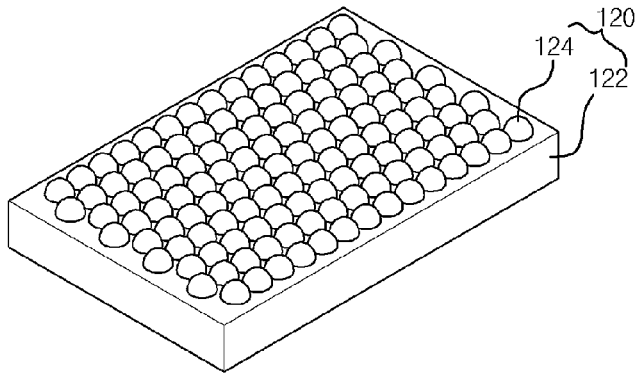
FIG. 10 shows an embodiment of an optical plate structure applied to the lighting device according to the disclosure.

FIG. 10 shows an embodiment of the optical plate structure applied to the lighting device according to the disclosure.

It is preferable that the optical plate 120 of the disclosure includes a number of micro lens pattern 124 basically formed on the base member 122.

Figure 11:
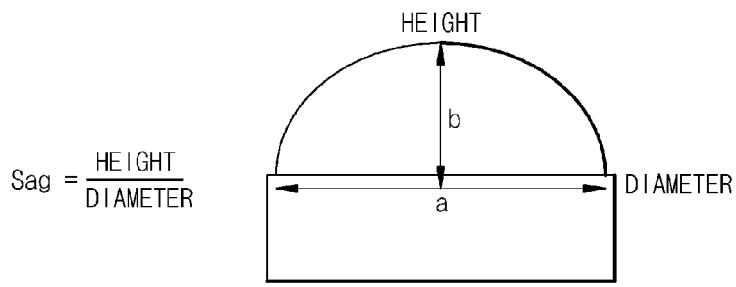
FIG. 11 shows a sag of a lens pattern.

Particularly, it is possible to reduce the UGR by adjusting the sag of the lens pattern to reduce the UGR using the optical plate formed with the micro lens pattern 124 in the present embodiment. FIG. 11 shows a sag of a lens pattern shown in FIG. 10. As shown in FIG. 11, the sag represents a ratio of the height 'b' of the lens for the diameter 'a' of the lens, and the sag may be expressed as the equation 1.

$$Sag = b/a \qquad \{Equation\ 1\}$$

As the larger the sag of each lens of the micro lens pattern array MLA, the light is more refracted in the direction facing the bottom side from a ceiling to reduce the URG.

However, a side light-leakage property called a side-lobe is generated at a predetermined section by the sag of the lens of the micro lens array, which does not meet UGR conditions. Further, the larger the sag of the lens, a recycle property returning in the direction of incoming light is increased, such that a lot of reflections increase, which results in reduced light efficiency.

That is, if the sag of the lens is too high (the sag is more than 0.35), UGR conditions is met but the light efficiency is reduced. Further, if the sag of the lens is too low (the sag is less than 0.1), the reduction of the light efficiency is minimized but UGR conditions is not met.

As such, when too narrowing emission angle range of the light to reduce the UGR, that is, when the sag of the lens is too large, the area illuminated with the light as well as the light efficiency are reduced. In this case, more illuminating devices are required to illuminate the same area compared with the illuminating devices with low sag of the lens. That is, in general, the larger the sag of the lens, the UGR is reduced but the light efficiency is also size-reduced (less than 90% compared with the diffusion plate).

Therefore, the sag of the lens of the micro lens array to minimize reduction of the light efficiency and to maximize the area of the light illumination should be determined while suiting for standard of the UGR.

Figure 12:
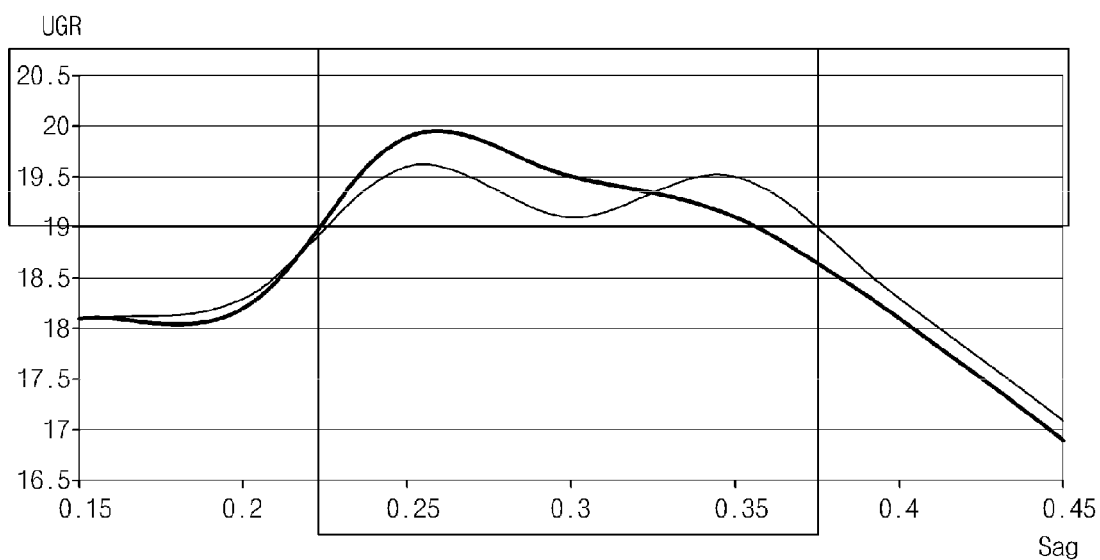
FIG. 12 shows relation between the URG and the sag and FIG. 13 shows relation between light efficiency and the sag.
Figures 13, 14:
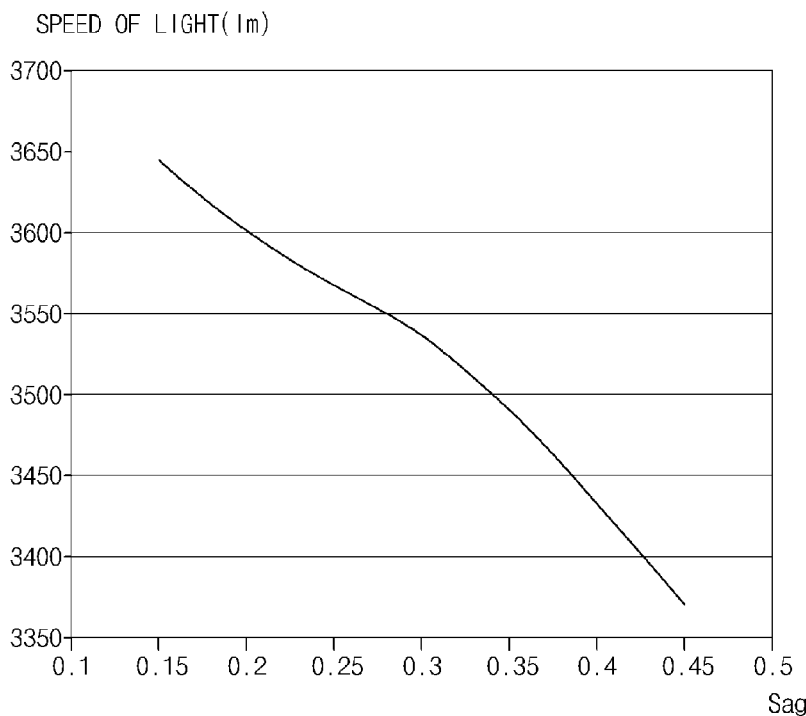
FIGS. 14 and 15 are the result of UGR simulation according to the fill factor of the micro lens patterns for the optical plate according to the disclosure.

FIG. 12 shows relation between URG and sag and FIG. 13 shows relation between the light efficiency and sag.

FIG. 12 and FIG. 13 are the case that the area of the illuminating device is 600×600 mm and brightness of the illuminating device is 400 lux.

In FIG. 12, the section of the sag of the lenses, in which the UGR is less than 19 of the room lighting conditions, is 0.1~0.22 or 0.35~0.5. when the sag of the lenses have 0.25~0.35, the UGR is rather increased due to the side-lobe (light-leakage property between 65 deg and 90 deg). Therefore, when the sag of the lenses have 0.25~0.35, the room lighting conditions, in which the UGR is less than 19, is not meet. Further, in FIG. 10, the higher the sag of the lenses, speed of the light is reduced, thereby lowering the light efficiency. Therefore, given to the light efficiency, it is most preferable that the sag of the lenses should be determined within range of 0.1~0.25 or 0.35~0.5. Likewise, when determining the sag of the lens to be lowered, that is, determining within the range of 0.1~0.25 or 0.35~0.5, the UGR reduces and the reduction of the light efficiency may be minimized.

FIG. 14 shows the result adjusting a fill factor of micro lens patterns 124 to reduce the UGR in the optical plate structure according to the disclosure shown in FIG. 10.

That is, the method adjusting the fill factor of the micro lens pattern 124 of the disclosure may be implemented as different method adjusting the reduction of the UGR using the optical plate of the disclosure. In this case, the fill factor of the micro lens pattern 124 of the disclosure is met within the range of 0.5~1.0 (50%~100%). (In this case, the fill factor is defined as the proportion occupied by the area of the micro lens pattern per the unit area of a base member.)

In this case, as described above in FIG. 12, the fill factor occupied with the area of the micro lenses pattern per the area of a base member for problem in that the speed of light is lowered in the range of specific sag is adjusted as the range of 0.5~1.0, thereby preventing the reduction for speed of the light and reducing the UGR.

It is possible to reduce the UGR when transmitting light by implementing the fill factor of the micro lens pattern formed on surface of the optical plate 120 transmitting the light in the disclosure as 50%~100%. In the structure shown, although the shape of the micro lens patterns are shown as the structure evenly disposed with the same shape and size, in contrast to this, it is possible to evenly dispose the micro lens patterns with shapes different from each other. In addition, the shape of the lens includes the shape of any one of a circle, an oval, a prism, a lenticular, R-prism. Particularly, in the case of 100% of the fill factor, the cross-section shape of the lens pattern is not circle but polygon (such as hexagon, octagon).

Figure 15:
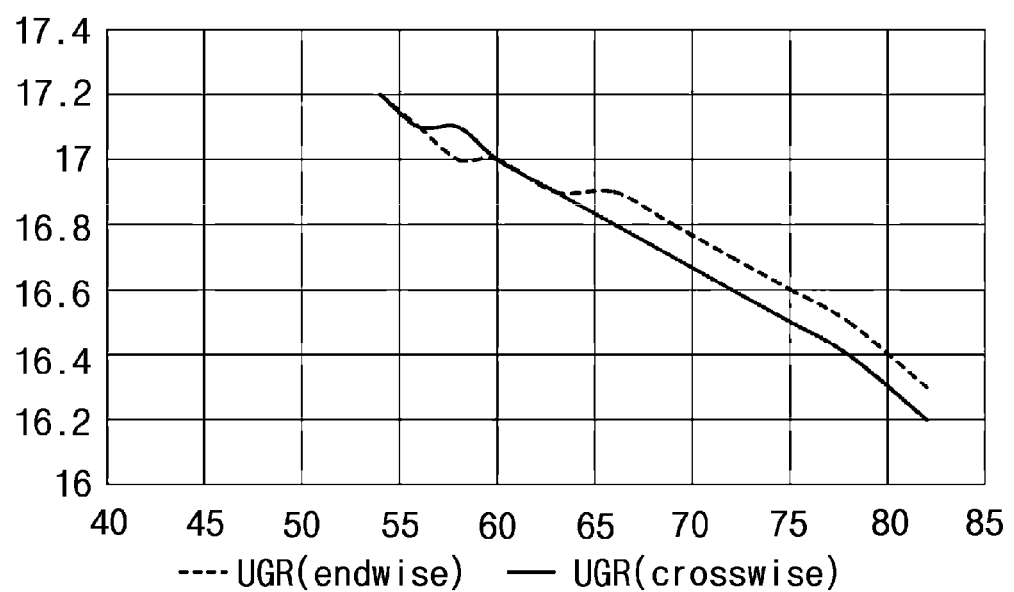

FIG. 15 is the result of the UGR simulation according to the fill factor of the micro lens patterns for the optical plate according to the disclosure (based on lens size/diameter: 80 μm, and lens sag:0.45). When looking at the shown result, the larger the fill factor of the lens pattern in the same sag, the UGR is decreased. Particularly, as described above in prior art, when the UGR is 19 or less, which may be applied to the lighting device, but the structure adjusting the lens pattern of the optical plate of the disclosure may be implemented to have UGR value within the range of 16.0~17.0.

Particularly, as described above in prior art, when the UGR is 19 or less, it has been described above that it is possible apply to the lighting device. From this point of view, the structure adjusting the fill factor of the lens pattern for the optical plate of the disclosure up to 50%~82% may be implemented to have UGR value within the range of 16.3~17.3. Of course, when the fill factor is 82%~100%, the UGR value is more decreased.

Of course, when the fill factor is less than 50%, there is also the case that UGR value becomes less than 19, but in such a case, a haze of the lens composing the optical plate is reduced, thereby increasing optical transmittance. As a result, the hot spot caused by the light source such as LED become visible from the outside of the lighting device, such that the condensing effect of the lens is much reduced, thereby being unable to perform function of the lighting device.

Further, the base member 122 of the optical plate 120 may basically use synthetic resin made of transparent material, and for example, any one of PC, PMMA and PET film may be used. The micro lens pattern 124 formed on surface of the base member 122 is integrally formed on the surface of the base member or may be formed by the process applying and patterning special resin, and for example, which may be formed by integral type of the lens pattern molding the transparent plate using heat and pressure or type applying the resin on the transparent plate and curing the resin using heat and pressure. In the micro lens pattern 124, it is preferable that a size of a pattern unit of the micro lens pattern is within the range of 20 μm~80 μm and the sag (height b:diameter a) of the micro lens pattern is 0.1~0.5.

Particularly, the fill factor of the micro lens pattern is adjusted within the range of 0.5~1.0 and simultaneously, the sag of the micro lens pattern is formed within the range of 0.1~0.25 or 0.35~0.5 to meet the UGR of 19 or less. Particularly, the fill factor of the micro lens pattern array is increased in the same sag of the disclosure, thereby lowering the UGR. In the region (0.35~0.5) that the sag of the lens pattern is high, the UGR is reduced and simultaneously, the optical efficiency is lowered. In the region (0.1~0.25) that the sag of the lens pattern is low, when increasing the fill factor, thereby lowering the UGR and preventing the lowering of the optical efficiency. Therefore, it is more preferable that the sag is formed within the range of 0.1~0.25. As a result, the fill factor is adjusted by the sag of the special value, thereby implementing the lighting device capable of adjusting the UGR value to be further more lower.

While the disclosure has been shown and described with reference to exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

The invention claimed is:

1. A lighting device, comprising:
a printed circuit board with a light source;
a frame portion formed around a region at which the light source is disposed; and
an illuminating member, wherein the illumination member comprises a diffusion plate, an optical plate over the diffusion plate, an adhesion layer, and an air gap between the diffusion plate and the optical plate;
wherein the adhesion layer is disposed on an edge of the diffusion plate;

wherein the frame portion includes a first frame accommodating the printed circuit board, and a second frame connected with the first frame and accommodating an insertion portion;

wherein a part of the illuminating member having the adhesion layer is inserted into the insertion portion, wherein the adhesion layer is in direct contact with the diffusion plate and the optical plate, wherein the optical plate includes a plurality of micro lens patterns, and a sag of each of the micro lens patterns is in a range of 0.1~0.25, the sag being defined as a ratio between a height of the corresponding micro lens pattern and a diameter of the same micro lens pattern, and a fill factor of each of the micro lens pattern is in a range of 0.5~0.82, wherein the fill factor is defined as a proportion of an area occupied by the corresponding micro lens pattern to a total area of one surface of the optical plate; and wherein the adhesion layer has a width greater than the diameter of each of the micro lens patterns.

2. The lighting device of claim 1, wherein the first frame includes:
  a base accommodating the printed circuit board; and
  an edge partition wall disposed at an outside of the base, wherein the insertion portion is disposed between the edge partition wall and the second frame.

3. The lighting device of claim 2, wherein the edge partition wall includes an opening portion inside the edge partition wall, and
  wherein the base is disposed in the opening portion of the edge partition wall.

4. The lighting device of claim 2, further comprising a reflection layer disposed on a surface of the print circuit board and an inside of first frame,
  wherein the printed circuit board is disposed on an inner surface of the base.

5. The lighting device of claim 2, further comprising a partition wall supporting portion protruded in a horizontal direction from an outside of the edge partition wall.

6. The lighting device of claim 4, wherein the second frame includes:
  an outside frame corresponding to the edge partition wall, wherein a center portion of the outside frame is open, and
  a guide frame bended at the center portion of the outside frame and connected with the first frame and a space portion.

7. The lighting device of claim 6, wherein the guide frame includes:
  a first guide portion connected with a top portion of the edge partition wall and one end of the guide frame; and
  a second guide portion formed with a step protruding from the first guide portion and accommodating the space portion to be spaced apart from the top portion of the edge partition wall,
  wherein an end of each of the diffusion plate and the optical plate is inserted into the space portion.

8. The lighting device of claim 7, wherein the end of each of the diffusion plate and the optical plate is disposed between the second guide portion and the partition wall supporting portion.

9. The lighting device of claim 7, wherein the first guide portion is in direct contact with a lower surface of the partition wall supporting portion.

10. The lighting device of claim 7, wherein the partition wall supporting portion is disposed on the guide frame, the end of the diffusion plate, and the end of the optical plate.

11. The lighting device of claim 1, wherein the adhesion layer is evenly or unevenly disposed with at least one separate pattern.

12. The lighting device of claim 1, wherein the adhesion layer is disposed at a periphery of a spacer optical member bonded to one side of the diffusion plate or the optical plate.

13. The lighting device of claim 1, wherein the adhesion layer comprises an adhesive resin layer or a double-sided adhesive tape.

14. The lighting device of claim 1, wherein the adhesion layer includes a double-sided adhesive tape and a spacer optical member, and the spacer optical member is disposed in middle of the double-sided adhesive tape.

15. The lighting device of claim 1, wherein the air gap has a width greater than the diameter of each of the micro lens patterns.

* * * * *